(12) United States Patent
Kneckt et al.

(10) Patent No.: US 9,072,073 B2
(45) Date of Patent: Jun. 30, 2015

(54) ADJUSTING CHANNEL ACCESS PARAMETERS DUE TO TRAFFIC LOAD

(75) Inventors: Jarkko Kneckt, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 125 days.

(21) Appl. No.: 13/519,009

(22) PCT Filed: Feb. 4, 2010

(86) PCT No.: PCT/FI2010/050063
§ 371 (c)(1),
(2), (4) Date: Jun. 25, 2012

(87) PCT Pub. No.: WO2011/095669
PCT Pub. Date: Aug. 11, 2011

(65) Prior Publication Data
US 2012/0294142 A1    Nov. 22, 2012

(51) Int. Cl.
| | |
|---|---|
| H04J 3/24 | (2006.01) |
| H04W 74/00 | (2009.01) |
| H04L 12/801 | (2013.01) |
| H04W 24/00 | (2009.01) |
| H04W 28/02 | (2009.01) |
| H04W 28/04 | (2009.01) |
| H04W 28/08 | (2009.01) |
| H04W 28/10 | (2009.01) |
| H04W 28/18 | (2009.01) |

(Continued)

(52) U.S. Cl.
CPC ............. *H04W 74/002* (2013.01); *H04L 47/11* (2013.01); *H04L 47/10* (2013.01); *H04W 24/00* (2013.01); *H04W 28/02* (2013.01); *H04W 28/04* (2013.01); *H04W 28/08* (2013.01); *H04W 28/10* (2013.01); *H04W 28/18* (2013.01); *H04W 36/22* (2013.01); *H04W 84/18* (2013.01)

(58) Field of Classification Search
CPC ................................. H04L 47/10; H04L 47/11
USPC .................................. 370/349, 373, 377, 442
See application file for complete search history.

(56) References Cited

U.S. PATENT DOCUMENTS 7,162,250 B2 * 1/2007 Misra ............................ 455/453
7,197,013 B2 * 3/2007 Douglas et al. ............... 370/252

(Continued)

FOREIGN PATENT DOCUMENTS

| WO | 2007064976 A1 | 6/2007 |
|---|---|---|
| WO | 2007080513 A2 | 7/2007 |

OTHER PUBLICATIONS

International Search Report of PCT/FI2010/050063, dated Nov. 4, 2010.

*Primary Examiner* — Ricky Ngo
*Assistant Examiner* — Dewanda Samuel
(74) *Attorney, Agent, or Firm* — Banner & Witcoff, Ltd.

(57) ABSTRACT

An apparatus (STA) receives from a first node (AP1) at least one channel access related parameter and a first congestion indication; and receives from a second node (AP2) a second congestion indication. The apparatus determines a combined congestion indication which is based at least on the first congestion indication and the second congestion indication; and determines a first channel access parameter for a channel between the apparatus and the first node based at least partly on the at least one channel access related parameter and the combined congestion indication. In specific embodiments, the channel access related parameters may be an initial EDCA parameter and a degradation factor.

20 Claims, 5 Drawing Sheets

(51) Int. Cl.
*H04W 36/22* (2009.01)
*H04W 84/18* (2009.01)

(56) References Cited

U.S. PATENT DOCUMENTS

| | | | |
|---|---|---|---|
| 7,362,776 B2 * | 4/2008 | Meier et al. | 370/468 |
| 7,400,901 B2 * | 7/2008 | Kostic et al. | 455/525 |
| 7,664,089 B2 * | 2/2010 | Zhao | 370/338 |
| 7,733,766 B2 * | 6/2010 | Ozer et al. | 370/216 |
| 8,125,969 B2 * | 2/2012 | Ji et al. | 370/338 |
| 2002/0110105 A1 * | 8/2002 | Awater et al. | 370/338 |
| 2005/0169294 A1 * | 8/2005 | Tseng et al. | 370/437 |
| 2006/0087974 A1 | 4/2006 | Ozer et al. | |
| 2006/0187840 A1 * | 8/2006 | Cuffaro et al. | 370/235 |
| 2006/0215686 A1 * | 9/2006 | Takeuchi | 370/445 |
| 2007/0206552 A1 | 9/2007 | Yaqub et al. | |
| 2008/0171550 A1 * | 7/2008 | Zhao | 455/445 |

* cited by examiner

ADJUSTING CHANNEL ACCESS PARAMETERS DUE TO TRAFFIC LOAD

TECHNICAL FIELD

The exemplary and non-limiting embodiments of this invention relate generally to wireless communication systems, methods, devices and computer programs and, more specifically, relate to congestion management in a wireless network such as for example ad-hoc, mesh and cognitive radio networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| AC | access category |
| AIFS | arbitration interframe space |
| AP | access point |
| CSMA/CA | collision sense multiple access/collision avoidance |
| CW | contention window |
| DIFS | distributed (coordination function) interframe space |
| EDCA | enhanced distributed channel access |
| IEEE | Institute of Electrical and Electronics Engineers |
| MP | mesh point |
| PIFS | point (coordination function) interframe space |
| QBSS | QoS basic service set |
| QoS | quality of service |
| STA | station |
| UE | user equipment |
| WLAN | wireless local area network |

Contention based networks have multiple users seeking radio resources for uplink transmissions. WLAN is a particular contention based network which users, termed stations or STAs, listen to see if the radio channel is clear and if it is they wait a minimum time period (DIFS) and if the channel is still clear they can transmit. If the channel is busy the STA then backs off a random number of slots and if the channel is not busy after counting down that number of slots the STA can transmit. Then there are other protocols the STA follows if the packet transmission fails. This is termed CSMA/CA in IEEE 802.11e, which is an improvement to prior versions of 802.11 WLAN. CSMA/CA is therefore intended to avoid collisions between simultaneous transmissions from different STAs each contending for a slot in which to transmit.

CSMA/CA based principles perform well particularly when the traffic load is small and there are enough radio resources for the offered load transmission. But studies show that this network channel access technique is less than optimal in the case where STAs are competing on the same resources, and/or if hidden STAs exist.

In some environments that are many access points (APs) located close to one another with possible overlapping bandwidths. Of course network planners seek to avoid situations where multiple APs operate at the same frequency, but in practice it is difficult to achieve in all instances. In many cases the same bandwidth may be in use by two or more APs which also have overlapping physical coverage areas, while simultaneously there is a nearby AP which provides coverage for its cell or area using another frequency and so does not need to share the bandwidth with any of the other APs. Also the WLAN APs are very often applied in homes and end users may locate the WLAN APs close to each other and using the same frequency, and they may not be capable or volunteer to spend time and effort to configure the APs appropriately.

There is a problem of traffic load balancing, which obviously becomes more important when the network traffic load increases. Under high load conditions the data transmissions require more time since more often the STA's contention based access attempts will fail to find a free channel. This of course degrades the power save performance from the STA's perspective, since it has to spend more time listening to the channel to find a free transmission opportunity.

When the media sharing concept was developed it was considered that it should provide efficient and fair opportunities for all STAs to transmit and receive data, and for this reason it is not a priority-only contention system. STAs with lower priority data still compete for radio resources with the STAs having higher priority data and can sometimes prevail which satisfies the fairness concern. A mechanism assures that the STAs with higher priority data obtain a transmission opportunity at a statistically higher rate than the STA with lower priority data which satisfies the efficiency concern. But where the traffic load is high, the contending STAs are still competing for the same fixed pool of radio resources made available by the AP.

The latest improvements to WLAN are that the contention based channel access mechanisms (EDCA in 802.11e) provide QoS support and AP prioritization for infrastructure networking. QoS is managed by EDCA parameters which help prevent the higher priority traffic from being interfered by lower priority traffic. For example, email data might be a lower priority than voice over WLAN traffic. The CSMA/CA approach also divides traffic into different access categories (ACs), each having traffic of different priorities. In practice, under IEEE 802.11e the APs apply their own set of EDCA parameters that typically allow more prioritized channel access (for example, calculation of shorter backoff values) than the EDCA parameters of the terminals/STAs. IEEE 802.11e also describes WLAN controlled channel access which is not contention-based, but at least the contention based access (with the EDCA parameters) has no way to balance the traffic load among cells.

SUMMARY

The foregoing and other problems are overcome, and other advantages are realized, by the use of the exemplary embodiments of this invention.

In a first aspect thereof the exemplary embodiments of this invention provide a method, comprising: receiving by an apparatus at least one channel access related parameter from a first node; receiving by the apparatus a first congestion indication from the first node; receiving by the apparatus a second congestion indication from a second node; determining by the apparatus a combined congestion indication which is based at least on the first congestion indication and the second congestion indication; and determining by the apparatus a first channel access parameter for a channel between the apparatus and the first node based at least partly on the at least one channel access related parameter and the combined congestion indication.

In a second aspect thereof the exemplary embodiments of this invention provide a memory storing a program of computer readable instructions that when executed by a processor result in actions comprising: determining a combined congestion indication which is based at least on a first congestion indication received from a first node and a second congestion indication received from a second node; and determining a first channel access parameter for a channel to the first node based at least partly on at least one channel access related parameter received from the first node and the combined congestion indication.

In a third aspect thereof the exemplary embodiments of this invention provide an apparatus, comprising at least one processor and at least one memory including computer program code. The at least one memory and the computer program code are configured to, with the at least one processor, cause the apparatus to perform: determining a combined congestion indication which is based at least on a first congestion indication received from a first node and a second congestion indication received from a second node; and determining a first channel access parameter for a channel between the apparatus and the first node based at least partly on at least one channel access related parameter received from the first node and the combined congestion indication.

These and other aspects of the invention are detailed more fully below.

DETAILED DESCRIPTION

Figure 1:
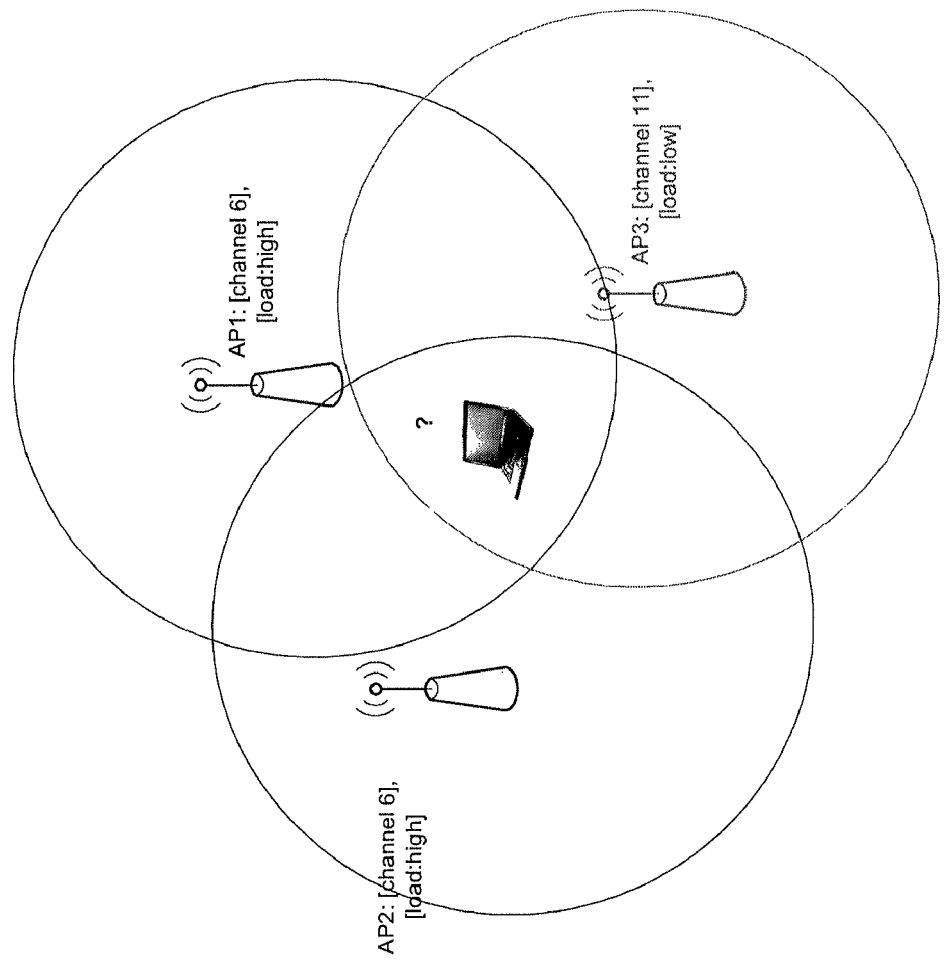
FIG. 1 is a schematic diagram of a STA in range of three APs, of which two are operating on the same frequency band, and is an environment in which exemplary embodiments of this invention can be used to advantage.

As an exemplary environment in which embodiments of the invention may be practiced, consider FIG. 1 which illustrates a first AP1, a second AP2 and a third AP3 each having a geographic coverage area or cell the overlaps in the position at which there is a STA. For purposes of describing these exemplary embodiments it is assumed these devices are operating as a WLAN network but as above these teachings may be applied at least also to ad hoc, mesh and WiFi direct networks, and additionally to cognitive radio networks which find and use 'holes' in the radio spectrum opportunistically. The APs may be true APs with connectivity to networks beyond the WLAN network, or one or more of the depicted APs may be mesh STAs with connectivity only to other WLAN APs and non-AP STAs.

Also at FIG. 1 for purposes of this description assume that each of AP1 and AP2 operate on a common frequency band, shown as channel 6 at 2.4 GHz. There may be other frequency bands which these APs use which do not overlap, which will be relevant as detailed below for traffic balancing. At the current time as written at FIG. 1 assume there is a high volume of traffic in the cell of AP1 and of AP2 while there is a low volume of traffic in the cell of AP3 which operates on a different frequency channel 11 as shown. AP1 and AP2 are congested on channel 6 but AP3 is not congested on channel 11.

Conventionally in 802.11 neither the APs nor the STA has a mechanism to measure congestion so as to make an intelligent choice for shifting some of the network traffic between cells in order to balance out the high traffic at AP1 and AP2 with the low traffic at AP3. More particularly, conventional APs do not have any means to make the transition to other APs more appealing nor to avoid causing distortions to other APs by maximizing throughput. As noted above, the contention-based access scheme in IEEE 802.11e is not sufficiently effective under high load conditions to maximize throughput, due at least in part to this lack of a load balancing mechanism. Exemplary embodiments of the invention enable these functionalities.

More specifically, exemplary embodiments of the invention use channel monitoring and defines logic for adjusting devices' EDCA parameters. These EDCA adjustments are based on traffic load. The parameter adjustment leads to using the larger EDCA parameters the more congested networks are operating within the area. In an embodiment there is a fixed degradation factor (which in an example embodiment for WLAN is termed an EDCA_Degradation_Factor) that is specific to the access categories. The degradation factor is used to adjust the EDCA parameters in use for congestion notification from each of the APs and Mesh STAs that the subject STA is supposed to be monitoring. From these adjusted EDCA parameters the STA can determine how many of the host and neighbor stations are congested. Where there are very many STAs operating in the congested coverage area and frequency, an example embodiment below shows that further adjustments need not be made for the case where the EDCA parameters are already adjusted to be at the poorest level. This poorest level can be signaled by the host AP to the STA as a maximum degradation factor or value, termed for WLAN as an EDCA_Poorest_Parameters, which in an example embodiment is access category dependent, just like the degradation factor.

As will be shown below with respect to FIG. 3, any of the EDCA parameters which are adjusted according to these teachings may be considered more generically to be a channel access parameter which the STA uses to gain channel access such as during a contention period. The degradation factor and the initial EDCA parameter sent by the AP may be termed more generally as channel access related parameters, because they are used to determine the actual (EDCA) values that the STA uses for its channel access.

Figure 2:
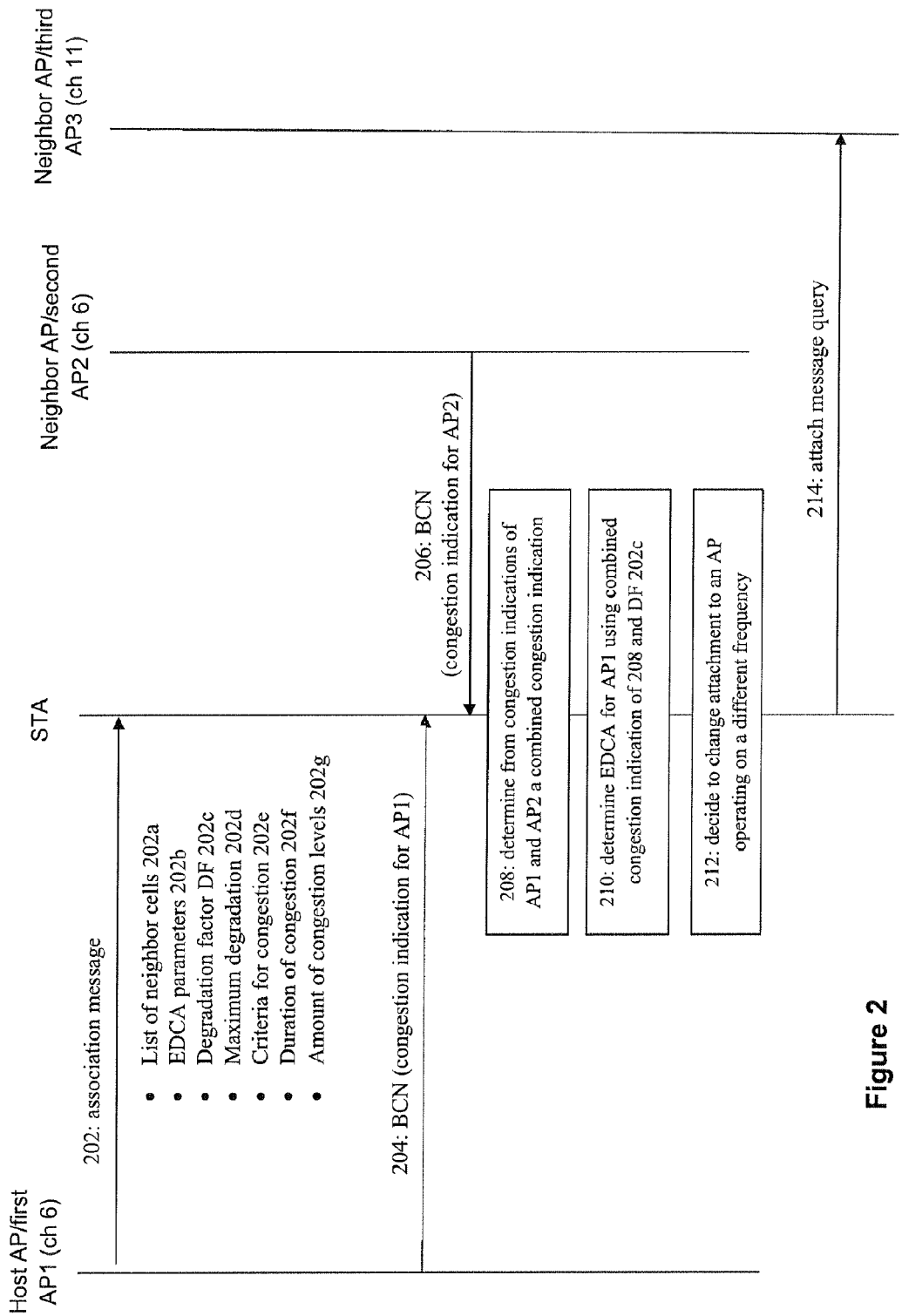
FIG. 2 is a signaling diagram showing messages and actions for the STA, AP1 and AP3 of FIG. 1 according to an exemplary embodiment of the invention.

Signaling and internal evaluation processes are shown in the signaling diagram of FIG. 2 for an exemplary embodiment of the invention. FIG. 2 assumes presence of the STA, first AP1, second AP2 and third AP3 of FIG. 1, in which the STA is initially attached to AP1 and AP2 is a neighbor AP sharing the same frequency as AP1 while AP3 is a neighbor AP on a different frequency from AP1.

At message 202 the first AP1 sends the STA an association message. In practice this is an exchange and there is more than one message, but in relevant part the STA receives from the first AP1 via the association message 202 the following pieces of information: a list 202*a* of neighbor cells; EDCA parameters 202*b* for the host cell/first AP1; a degradation factor 202*c*; a maximum degradation 202*d*; a criteria for congestion 202*e*, a duration for the congestion 202*f* and the amount of congestion levels 202*g*. Certain of these are present only in specific embodiments and so not all embodiments have the first AP1 sending all of the above information elements to the STA upon attachment.

In other topologies, like in ad hoc (IBSS) or in mesh (MBSS) the same information is network specific and the STA that operates in the network may apply default values, or the applied parameters may be repeated in mesh peering establishment frame exchange.

The list of neighbor cells 202a (APs and/or mesh APs) are those cells for which the STA is to monitor congestion status. This list may be limited to only those neighbor cells sharing a frequency band, or may include other neighbor cells for which there is no frequency band overlap. The listed APs are those which are trusted. In the example of FIG. 1 AP2 shares the channel 6 frequency with the host AP1 and AP3 is on frequency channel 11. If the first AP1 does not send this list 202a, the STA can simply detect neighbors and monitor them for congestion as detailed below. It is deemed to be less power intensive on the STA if the first AP1 sends a list 202a for the STA to congestion-monitor where the list includes less than all neighbors. The list of neighbor cells may contain only well-behaving cells who share the same policy for congestion monitoring. Or the list may contain cells to which the STA may handover.

In one embodiment, the initial EDCA parameters 202b that the STA receives on the attachment message 202 are for the host cell/first AP1. As above, any of these may be considered a channel access related parameter. Conventionally these are transmission opportunity limit TXOPLimit, an arbitration interframe space AIFS number, a contention window CW minimum length, and a CW maximum length. The TXOPLimit is a bounded time interval during which the STA can send as many frames as possible (the STA may fragment transmitted frames to smaller fragments in order not to continue transmission beyond the end of its TXOPLimit). The TXOP concept reduces the problem of low rate stations gaining an inordinate amount of channel time and reduces the overhead in frame transmission. AIFS number and CW minimum/maximum are also related to the contention access procedure. Adjusting any of these adjusts the channel access. For example, a longer TXOPlimit gives the STA more time to transmit during its channel access, and consequently it can achieve higher throughput. A small AIFS number means the STA can start its backoff earlier which controls the time of its channel access. A longer minimum or maximum CW coordinates the limits in which the random value for backoff is selected. Smaller backoff reduces the waiting time for the STA to find an open slot to initiate TXOP. These EDCA parameters can be considered more generally as channel access parameters, for use when applying these teachings to other non-WLAN systems that may not use EDCA parameters specifically. The description below is in the context of one EDCA parameter being adjusted per cell per access category, but in an exemplary embodiment the adjustments can be done on more than one EDCA parameter.

In another embodiment, the initial EDCA parameter or parameters that the host AP1 delivers to the STA are common for all nearby APs. In a still further embodiment, these initial EDCA parameters are not necessarily common and the host AP1 delivers to the STA initial EDCA parameter(s) for each of one or more neighbor APs, shown at FIG. 1 as AP2 and AP3.

As noted above, the STA receives from the first AP1 a degradation factor 202c which, like the initial EDCA parameters, can be termed more generally a channel access related parameter. This factor is used to adjust the EDCA/channel access parameter. For the case of multiple access categories like WLAN, there is a plurality of degradation factors, which may be access category specific and the initial EDCA parameter per access category is adjusted using the respective degradation factor for that category. By example, the degradation factor 202c for TXOPLimit may be 0.2 ms. Generally the STA determines the amount of APs (or APs and mesh STAs) that indicate congestion and multiplies that amount by the congestion factor.

In a specific example, the STA receives from the first AP1 (for example, in a beacon frame) an indication that AP1 is congested to congestion level 2. The receiving STA is configured to make adjustments to the TXOPLimit which the AP1 has indicated in the EDCA parameters 202b of the association signaling 202. Assume that the signaled TXOPLimit for all STAs associated to AP1 is set as 1.3 ms, then in an exemplary embodiment the STA multiplies the congestion level (from the beacon frames received from the first AP1) by the degradation factor 202c (0.2 ms) which is signaled also in the attachment message 202 and arrives at a calculated degradation value of 0.4 ms. The STA then adjusts the TXOPLimit of 1.3 ms by the calculated degradation value to arrive at an adjusted TXOP of 0.9 ms. The smaller TXOPLimit enables other STAs to access the channel sooner, and thus enables shorter (less efficient) TXOPs, but shorter TXOPs allow the congestion among the STAs to be cleared out.

Now assume that there are two APs on the same channel, AP1 and AP2 that have both indicated that they are congested to congestion level 2. In this case the total degradation is calculated at the STA which receives the beacons from both of those APs by summing up all levels (2+2) to yield a combined congestion factor of 4 and by multiplying the degradation factor with the combined congestion factor yields 0.2 ms*4=0.8 ms. Using the original and unaltered 1.3 ms TXOPLimit, the above deduction of 0.8 ms then leaves the TXOPLimit at 0.5 ms.

In an embodiment the STA can also receive in the association message 202 a maximum degradation value 202d. In embodiments in which this value is used, it is a hard limit on how far the channel access/EDCA parameter can be adjusted. Adapt the example from the paragraph immediately above so that the STA receives congestion indications from five APs, indicating that these APs are congested to levels 1, 2, 1, 2 and 2. Further in this example there is signaled to the STA a maximum degradation value 202d of 0.9 ms In this case the STA computes the calculated degradation value as X=8*0.2 ms=1.6 ms, which would lead to an unspecified TXOPLimit of 1.3 ms−1.6 ms=−0.8 ms. Before applying that the STA checks the calculated degradation value against the maximum degradation value 202d and finds the calculated one is larger. The STA then applies only the signaled maximum degradation value of 0.9 ms in this example to arrive at the adjusted TXOPLimit of 1.3 ms−0.9 ms=0.4 ms which the STA does apply on its next contention for radio access.

Any of the above examples can be readily extended to the AIFS and CW minimum/maximum parameters also. The degradation factor 202c is applied to the congestion indications that are combined across all of the APs that are on the list 202a given to the STA in the association signaling 202. Then instead of adjusting TXOPLimit as in the above examples, the AIFS or CW minimum/maximum are determined based on (at least) the combined congestion indication and the degradation factor 202c. And of course these other EDCA/channel access parameters can be limited by a maximum degradation factor 202c and managed by the duration 202f detailed below.

Degradation factor may define an amount of slots that are added to AIFSN. If the amount is not an integer, the rounding is done upwards for example. For instance, every congestion level may increase AIFSN by one until the maximum degradation value is met. For instance, assume that AIFS=1 and the degradation factor is 0.66 and the combined congestion indication is 2, the degraded AIFSN will be 1+0.66*2=2.22 which is rounded up to 3.

Degradation factor for CWmin and CWmax may set that CW values are doubled by the time indicated in combined congestion indication. For instance, assume that CWMin=3 and the combined congestion indication is 2, the degraded CWMin=3*($2^2$)=12. Another alternative for the algorithm for CWmin value calculation adds a constant to the CWMin value. For instance if the added constant value is 4, the degraded CWMin=3+4*2=11. The same algorithm may be applied for both CWMin and CWMax, but the parameters in use are separately specified for both CWMin and CWMax.

The attachment message 202 may also include in exemplary embodiments a criteria for congestion 202e. This criteria for congestion 202e is a threshold as to what is considered congested and what is not. By example and not by way of limitation the criteria for congestion 202e is a QBSS load limit. Another embodiment of the criteria for congestion 202e, though in beacon frames rather than in the attachment message 202, is the congestion bit or bits noted in the two examples above. This congestion bit is in an embodiment a new field of the beacon frame which explicitly indicates whether the device (AP or mesh STA) sending the bit is congested or not. Alternatively there may be defined a new congestion frame for communicating this explicit indication of congested or not congested.

The congestions levels 202g indicates the amount of congestion levels that one device may indicate. If the device indicates 3 levels it may apply factors 0, 1 and 2 for degradation factor calculation. Similarly the device shall have congestion criteria for congestion levels 0, 1 and 2, with for example zero indicating not congested, 2 indicating most congested and 1 indicating somewhat congested.

Finally, certain embodiments of the invention can include a duration for congestion information element 202f in the attachment message 202. Consider an example adapted from above, in which the original TXOP of 1.3 ms is adjusted by the 0.2 ms degradation factor 202c to yield an adjusted TXOP of 1.1 ms. The duration of the congestion information element 202f gives a time period for how long that 0.2 ms degradation factor adjustment remains valid unless no additional indication from the congested device is received. Assume for example the indicated duration is 5 ms. When that time period expires the STA re-adjusts the adjusted 1.1 ms back to 1.3 ms since the duration 202c for the adjustment of 0.2 ms has expired. This is an automatic adjustment requiring no further signaling between the first AP1 and the STA. During that 5 ms the STA may get other indications of congestion from the first AP1 to modify the congestion level. For the case where the STA gets a congestion level 1 indication from a beacon of the first APs then the re-adjusted TXOP simply remains at 1.1 ms, since the new congestion adjustment of −0.2 ms negates the expiring older adjustment of +0.2 ms. If the congestion level changes during that 5 ms the new congestion level value is taken immediately into use.

So summarizing the above, the STA receives an attachment message 202 from the first AP1 to which it is attached, that attachment message includes at least a channel access related parameter (for example the degradation factor DF 202c) and at least one channel access parameter 202c which for a WLAN-specific implementation can be one or more EDCA parameters such as the TXOPLimit, AIFS number, CW minimum or maximum, or some other EDCA parameter. Receipt of the channel access related parameter/DF 203c is shown at block 302 of the logic diagram at FIG. 3.

Figure 3:
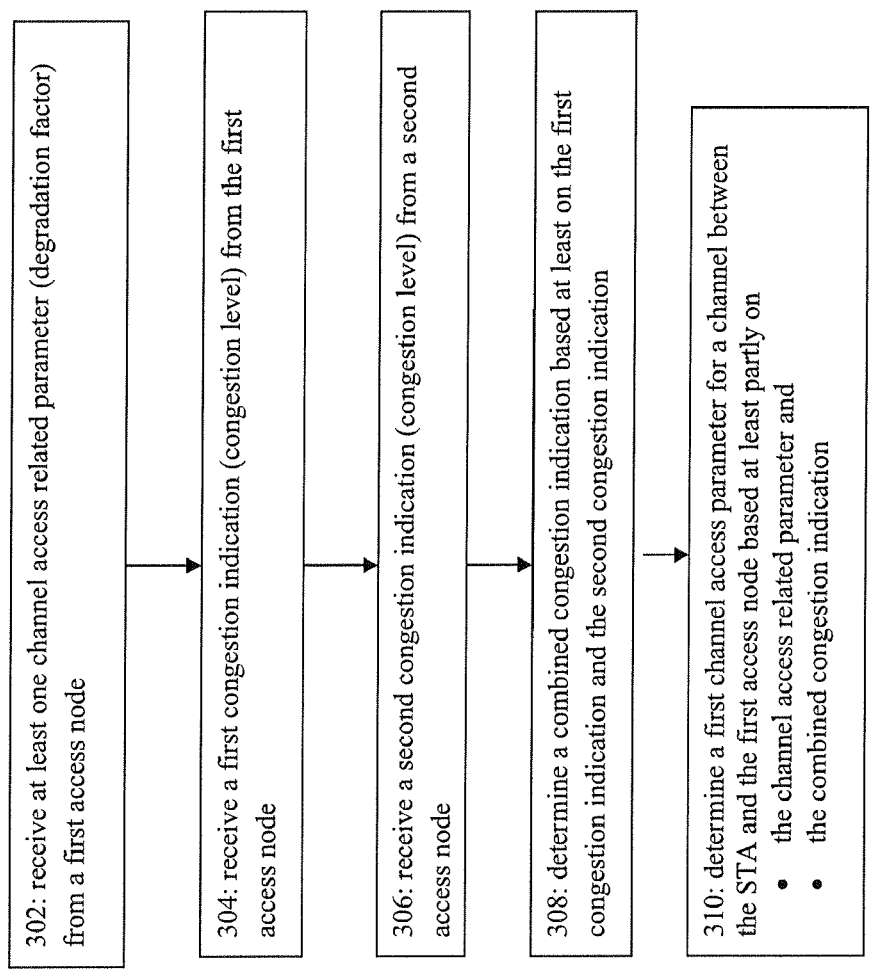
FIG. 3 is a logic flow diagram that illustrates the operation of a method, and a result of execution of computer program instructions embodied on a computer readable memory, in accordance with the exemplary embodiments of this invention from the perspective of the STA shown at FIG. 1.

At message 204 of FIG. 2 and block 304 of FIG. 3, the STA receives from the first access node/AP1 a congestion indication such as for example the congestion level or the binary congested/not congested bit. In the signaling diagram of FIG. 2 is received in a beacon frame but can be received in another type of message in other exemplary embodiments.

At message 206 of FIG. 2 and block 306 of FIG. 3, the STA receives from the second access node/AP2 a second congestion indication, which may be received in a beacon frame or in some other message from the neighbor cell. The STA can do this because as shown at FIG. 1 it lies in an overlapping coverage area, which is true whether or not the second AP2 is on the same frequency as the first AP1.

Assume as in FIG. 1 that the first AP1 and the second AP2 are on the same frequency, such as channel 6. At block 208 of FIGS. 2 and 308 of FIG. 3, the STA then determines a combined congestion indication from the first congestion indication it received from AP1 and the second congestion indication it received from AP2. In the examples above these are added but other logical combinations can be used for other embodiments for the case where neighbor access nodes are on the same channel. Finally at block 210 of FIGS. 2 and 310 of FIG. 3 the STA determines a first channel access parameter (for example, a TXOPLimit or other EDCA parameter in WLAN-specific implementations) for a channel between the STA and the first access node/AP1 using the combined congestion indication and the degradation factor. In the examples above the combined congestion indication was multiplied by the degradation factor but other logical combinations can be used in other exemplary embodiments.

From this determined EDCA parameter (which as above may be limited by the maximum degradation 202d) the STA concludes that the first AP1 is congested. The STA may not yet know the congestion status of AP2. In an embodiment, the STA also obtains, from AP1, the initial EDCA parameter and the degradation factor for AP2. Knowing these channel access related parameters for AP2 the STA can then compute the channel access parameter/updated EDCA parameter for AP2 using the same combined congestion indication is computed for the AP1 calculation, thereby determining whether or not AP2 is also congested. The STA can decide to handover to AP2 at this point and use AP2 for its next access node for communications if AP2 is not congested, which the STA can determine simply by comparing the channel access parameter/adjusted EDCA parameter for AP1 to that for AP2.

In an embodiment, once the STA determines from the adjusted EDCA parameter that the host AP1 is too congested, the STA chooses to handover to an AP operating on a different frequency than that host AP1, which in the case of FIG. 2 is AP3 which operates on channel 11. This is shown at processing block 212 of FIG. 2 where the STA decides to change its attachment from the host cell/first AP1 to the third access node/AP3 that operates on a different channel. Message 214 is simply a new attachment message query from the STA to the third access node/AP3 which will become the new host cell to the STA. Whether or not the STA checks congestion for AP2, the STA may compute the channel access parameter/adjusted EDCA parameter for AP3, using the channel access related parameters for AP3 that the STA received from its host AP1. At FIG. 1 AP3 is on a different frequency channel and so is more likely to be not congested if the channel of AP1 and AP2 are congested. As with the AP2 channel access parameter, the STA need only compare the AP3 channel access parameter with that of AP1 to see which is less congested. In an embodiment, the STA gets the congestion indication from AP3, for example by temporarily changing frequency to the AP3's channel 11 and receiving AP3's beacon, probe response or some other message, and computing the channel access parameter for AP3 using the initial EDCA and degradation parameters for AP3 (or a common initial EDCA and/or degradation parameter) which the STA received from AP1.

This is because the EDCA parameters computed with the congestion indications from AP1 and AP2 are not valid for AP3 since AP3 operates on a different frequency. In an embodiment the STA may decide to handover to AP3 based only on the fact that the channel on which AP1 and AP2 operate is congested and AP3 is on a different channel, rather than computing the channel access parameter for AP3 and comparing it to that of AP1 as above. For the case in which the AP3 channel overlaps partially with the AP1 and AP2 channel, then the STA would see AP3 when monitoring for AP1 and AP2 anyway even though the EDCA parameters for AP1 and AP2 are not valid for the partially overlapping channel on which AP3 operates.

In an embodiment the AP can determine that one or more of the neighbor APs are congested by listening to their congestion indications and/or receiving congestion indication reports from one or more STAs associated with those neighbor APs. By example, those congestion indication reports may comprise either information on congestion indications that the reporting STA has received from nearby APs, and/or the reports may comprise the combined congestion indication value that is derived by the STA. The AP may use this information either for adjusting parameters that it sends to the STAs, and/or to provide the congestion information directly to the STAs in some convenient format (not necessarily the format in which the AP received the congestion information) so that the STAs may know that some other neighbor APs are in congestion without the STAs having to receive congestion indications from those APs.

In an embodiment in which there is a list of devices for which the STA is to monitor congestion status, that list may be preconfigured during the network installation phase or the first AP1 (as well as other APs) may discover and update the list based on neighbor measurements/neighbor lists. The list may be configured to include all APs and/or mesh STAs operating in the same bandwidth/channel, or some other criteria may be used by which the list includes, at least sometimes, less than all neighbor APs. The list need not identify APs but may simply indicate to monitor all APs in the operation channel for the congestion.

For embodiments which do not use the duration of congestion indication 202f, the adjusted EDCA parameter remains valid until a frame is received that indicates that the device sending the frame is no longer congested. In an embodiment these can be combined so the duration is overridden if there is a frame indicating that the congested status is ended.

In the examples above the congestion level is signaled as one or more bits indicating congestion or not and if more than one bit is available a level of congestion is signaled. For example the congestion level may be signaled as a plain unsigned number from 0 to 4, zero indicating no congestion and 4 indicating highest congestion. In other embodiments the QBSS load element of the beacon and probe-response frames can be used to specify a congestion level.

The STA can determine itself when its EDCA/channel access parameters are poor and when it is appropriate to change from the crowded host/first AP1 to the less crowded neighbor AP/third AP3. For example, if the STA determines that the host AP1 EDCA parameters as adjusted have become really poor, it may consider of its own accord changing the AP to which it is associated as in block 212 of FIG. 2. In any event, the AP-specific degradation factor 202c and the congestion indications from all APs in the area on the same frequency is a mechanism by which the network enables UEs to see which AP/frequency is congested and so choose another. The STA can try associating to AP2 if the STA sees the congestion level of AP2 is lower than that of AP1, or more likely the STA will simply choose an AP operating on a different frequency if one is available.

The most effective load balancing will be where congested channels overlap in frequency with uncongested channels of neighbor APs, because the STA will not need to monitor other frequencies beyond its host AP in order to see the less congested overlapping frequency. For example, if channel 11 on which AP3 operates overlaps in frequency with channel 6 on which AP1 and AP2 operate, then the congestion indication of AP3 will be included in the calculation to adjust the EDCA parameter of AP1, meaning the STA will have the congestion indication/level directly from AP3 without any additional searching by changing frequencies to the AP3's channel 11 as noted above. Once the STA sees that AP1 is congested it can then handover directly to AP3 since the STA sees the AP3 congestion level is lower and that AP3 operates on a different channel than AP1 or AP2 The STA will also see that the degradation factor 202c for AP3, which the STA received from AP1, is less than that for AP1, and so the calculation done by the STA on AP3 will show that AP3 is less congested than AP1.

For the case where the STA is operating in the power-save state, it may not receive congestion indications from all the neighboring APs or mesh STAs. In this case, the power saving terminals/STAs still have better EDCA parameters than the conventional active mode terminals not employing the embodiments of this invention, which results in better performance and reduced power consumption for even those power-saving STAs.

For the case where the AP or mesh STA is operating in the power-save state, it may not receive congestion indications from all the neighboring APs or mesh STAs. In this case, the power saving APs or mesh STAs still have better EDCA parameters than the conventional active mode APs or mesh STAs not employing the embodiments of this invention, which results in better performance and reduced power consumption for even those power-saving APs or mesh STAs.

So according to an embodiment of the invention there is a method, and a memory storing a computer program which when executed by a processor result in actions, and an apparatus comprising a processor and a memory storing computer program code which when executed by the processor cause the apparatus to receive at least one channel access related parameter from a first access node; receive a first congestion indication from the first access node; receive a second congestion indication from a second access node; determine a combined congestion indication which is based at least on the first congestion indication and the second congestion indication; and determine a first channel access parameter for a channel between the apparatus and the first access node based at least partly on the at least one channel access related parameter and the combined congestion indication.

In a particular but non-limiting embodiment of the above, a second channel access parameter for the channel between the apparatus and the first access node is also determined based at least partly on the at least one channel access related parameter and the combined congestion indication. For example, the first channel access parameter may be an EDCA parameter (TXOPLimit, AIFS number, CW minimum length, and CW maximum length). The second channel access parameter can be another of these. For the case in which there are three APs/access nodes on the same channel/frequency, the combined congestion indication is determined based at least on the first congestion indication, the second congestion indication, and a third congestion indication received from a third access node.

In another particular but non-limiting embodiment of the above, the second access node is selected as a next access node for communication based at least partly on the first channel access parameter. For example, the STA may decide that the first channel access parameter is too restrictive meaning the first access node is too congested, and it may choose to handover to the second access node by comparing an adjusted EDCA parameter of the first access node to an adjusted EDCA parameter for the second access node. This may occur for example if the first congestion indication is for a first frequency band, the second congestion indication is for a second frequency band which partially overlaps the first frequency, and the combined congestion indication is specific to the combined first and second frequency bands.

In another particular but non-limiting embodiment of the above, the first channel access parameter is based at least partly on a previous channel access parameter, such as the unadjusted EDCA parameter received from the first access node.

Any of the above exemplary embodiments can of course have the channel access related parameter and the channel access parameter be different values for different access nodes; and/or for different frequencies, and/or for different traffic access categories.

By the above embodiments there is provided the technical effect of inter-cell load balancing via a tangible traffic load balancing mechanism. STAs have the clear benefits of performing handovers based on traffic load. The technical effect of the above is increased system capacity.

Figure 4A:
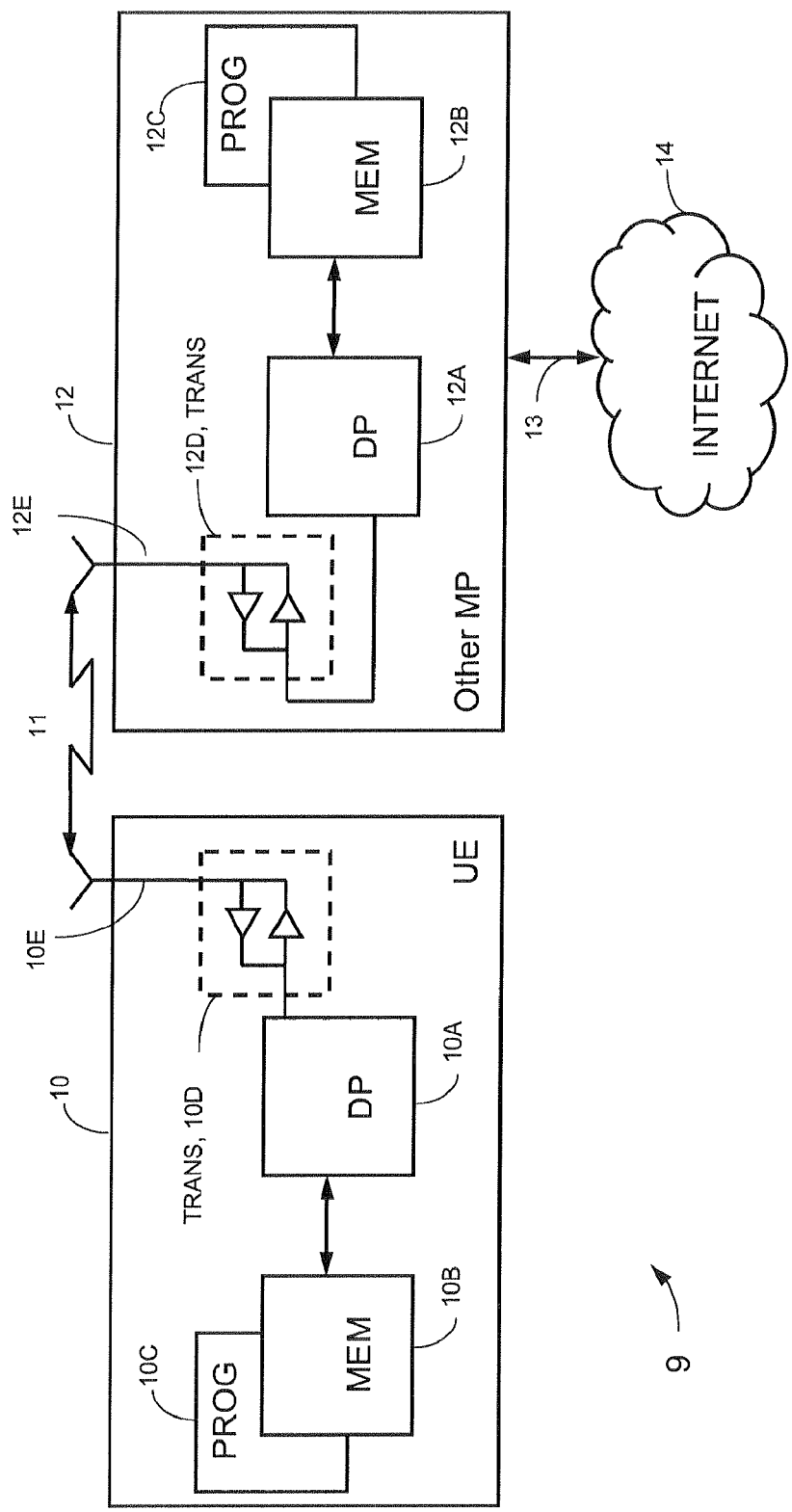
FIG. 4A shows a simplified block diagram of certain apparatus, the STA and an AP from FIG. 1, according to various exemplary embodiments of the invention.

Reference is made to FIG. 4A for illustrating a simplified block diagram of various electronic devices and apparatus that are suitable for use in practicing the exemplary embodiments of this invention. In FIG. 4A a wireless network 9 is adapted for communication over a wireless link 11 with an apparatus, such as a mobile communication device which above is referred to as a UE 10 in the position of the STA of FIGS. 1-2, via a network access node, such as a mesh point MP or AP which is in the position of the first AP1 of FIGS. 1-2. The network 9 may provide connectivity via a link 13 to a broader network such as the Internet 14.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the MP 12 via one or more antennas 10E. The MP 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas 12E.

At least one of the PROGs 10C and 12C is assumed to include program instructions that, when executed by the associated DP, enable the device to operate in accordance with the exemplary embodiments of this invention, as is detailed with particularity above.

That is, the exemplary embodiments of this invention may be implemented at least in part by computer software executable by the DP 10A of the UE 10 and/or by the DP 12A of the MP 12, or by hardware, or by a combination of software and hardware (and firmware).

For the purposes of describing the exemplary embodiments of this invention the UE 10 may be assumed to also include a QoS adjuster 10F, and the MP 12 may include a degradation value generator 12F, to accomplish the blocks of FIG. 3 and the signaling and blocks of FIG. 2 according to the exemplary embodiments of the invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 4B:
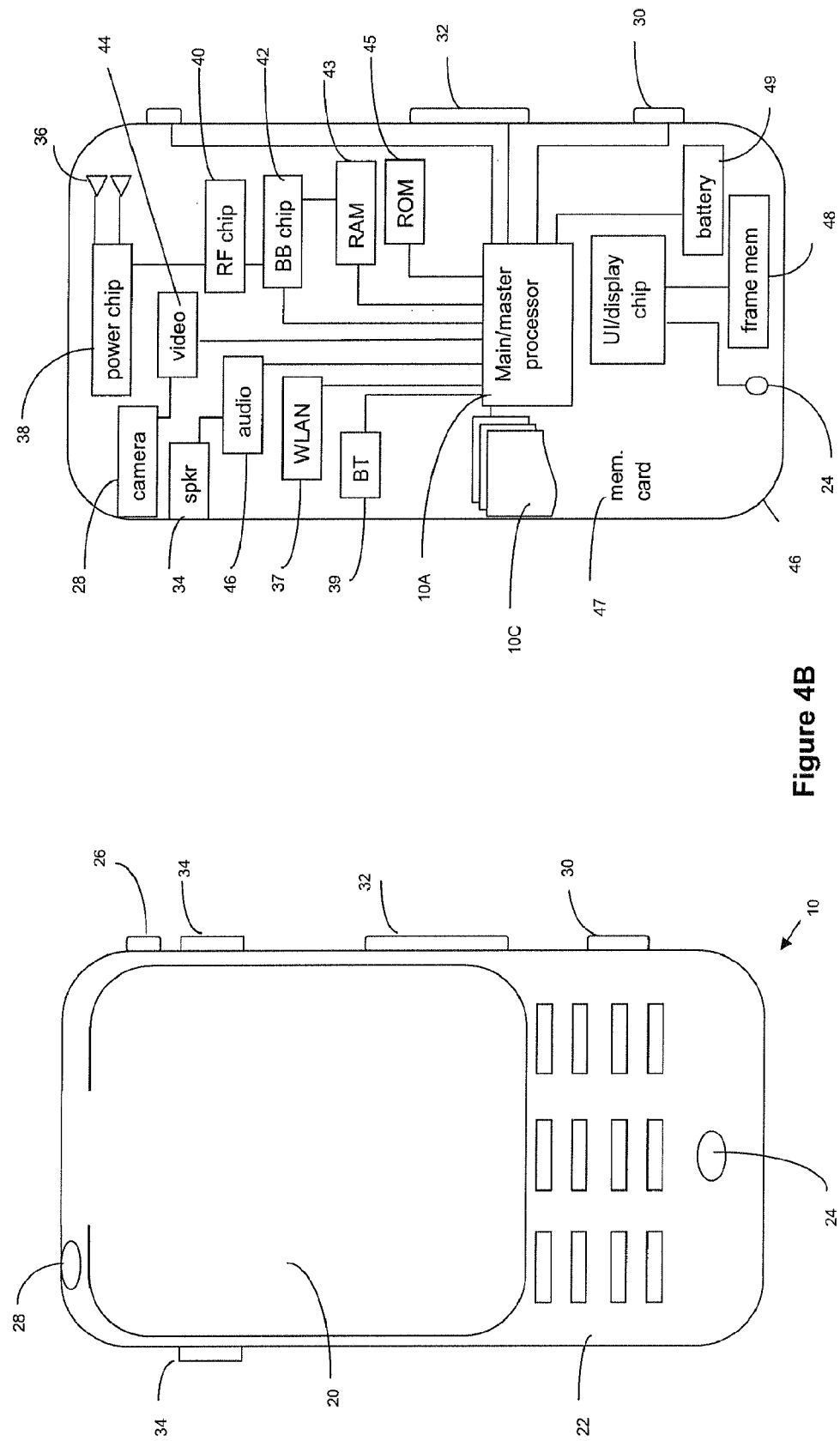
FIG. 4B shows a more particularized block diagram of the UE shown at FIG. 4A which can operate as the STA of FIG. 1 or as a mesh STA in the position of an AP of FIG. 1.

FIG. 4B illustrates further detail of an exemplary UE in both plan view (left) and sectional view (right), and the invention may be embodied in one or some combination of those more function-specific components. At FIG. 4B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 4B are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or MP 12, may operate in a slave relationship to the main processor 10A, 12A, which may then be in a master relationship to them. Embodiments of this invention need not be disposed in any individual processor/chip but may be disposed across various chips and memories as shown or disposed within another processor that combines some of the functions described above for FIG. B4. Any or all of these various processors of FIG. 4B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of antennas 12E rather than the two shown at FIG. 4B.

Note that the various chips (e.g., 38, 40, 42, etc.) that were described above may be combined into a fewer number than described and, in a most compact case, may all be embodied physically within a single chip.

The various blocks shown in FIG. 3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WLAN system, it should be appreciated that the exemplary embodiments of this invention are not limited for use with only this one particular type of wireless communication system such as ad hoc, mesh and cognitive systems mentioned above.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (for example, degradation factor, maximum degradation value, etc.) are not intended to be limiting in any respect, as these parameters may be identified by any suitable names. Further, the computations that use these various parameters may differ from those expressly disclosed by non-limiting example herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
   at least one processor; and
   at least one memory storing computer program code configured to, with the at least one processor, cause the apparatus to at least:
   determine a combined congestion indication which is based at least on a first congestion indication received from a first node and a second congestion indication received from a second node;
   determine a first channel access parameter for a channel between the apparatus and the first node based at least partly on at least one channel access related parameter received from the first node and the combined congestion indication; and
   determine a second channel access parameter for the channel between the apparatus and the first node based at least partly on the at least one channel access related parameter and the combined congestion indication.

2. The apparatus according to claim 1, wherein the computer program code is configured to, with the at least one processor, cause the apparatus to:
   determine a second channel access parameter for a second channel between the apparatus and the second node based at least partly on a second channel access related parameter received from the first node and the combined congestion indication, wherein the second channel is on a same frequency as the channel between the apparatus and the first node.

3. The apparatus according to claim 2, wherein the computer program code is configured to, with the at least one processor, cause the apparatus to:
select the second node as a next access node for communication based on comparing the first channel access parameter to the second channel access parameter.

4. The apparatus according to claim 1, wherein the computer program code is configured to, with the at least one processor, cause the apparatus to:
determine a third channel access parameter for a third channel between the apparatus and a third node based at least partly on a third channel access related parameter received from the first node and a third congestion indication received from the third node, wherein the third channel is on a different frequency than the channel between the apparatus and the first node.

5. The apparatus according to claim 4, wherein the computer program code is configured to, with the at least one processor, cause the apparatus to:
select the third node as a next access node for communication based on comparing the first channel access parameter to the third channel access parameter.

6. The apparatus according to claim 4, wherein the computer program code is configured to, with the at least one processor, cause the apparatus to:
scan the different frequency, resulting in receipt of a message that comprises the third congestion indication.

7. The apparatus according to claim 1, wherein the combined congestion indication is determined based at least on the first congestion indication, the second congestion indication, and a third congestion indication received from a third access node.

8. The apparatus according to claim 1, wherein the computer program code is configured to, with the at least one processor, cause the apparatus to:
select the second node as a next access node for communication based at least partly on the first channel access parameter.

9. The apparatus according to claim 1, wherein the at least one channel access related parameter comprises at least one degradation parameter and at least one initial channel access parameter.

10. The apparatus according to claim 1, wherein the at least one channel access related parameter and the first channel access parameter comprise different values for different access nodes.

11. The apparatus according to claim 1, wherein the first channel access parameter comprises at least one enhanced distributed channel access (EDCA) parameter.

12. The apparatus according to claim 11, wherein the at least one EDCA parameter comprises at least one of a transmission opportunity limit (TXOPLimit), an arbitration interframe space (AIFS) number, a contention window (CW) minimum length, and a CW maximum length.

13. The apparatus according to claim 1, wherein the first congestion indication is for a first frequency band, the second congestion indication is for a second frequency band which partially overlaps the first frequency band, and the combined congestion indication is specific to a combination of the first frequency band and the second frequency band.

14. The apparatus according to claim 1, wherein the at least one channel access related parameter and the first channel access parameter are specific to a particular traffic access category.

15. A method comprising:
receiving by an apparatus at least one channel access related parameter from a first node;
receiving by the apparatus a first congestion indication from the first node;
receiving by the apparatus a second congestion indication from a second node;
determining by the apparatus a combined congestion indication which is based at least on the first congestion indication and the second congestion indication;
determining by the apparatus a first channel access parameter for a channel between the apparatus and the first node based at least partly on the at least one channel access related parameter and the combined congestion indication; and
determining a second channel access parameter for the channel between the apparatus and the first node based at least partly on the at least one channel access related parameter and the combined congestion indication.

16. The method according to claim 15, further comprising:
determining a second channel access parameter for a second channel between the apparatus and the second node based at least partly on a second channel access related parameter received from the first node and the combined congestion indication, wherein the second channel is on a same frequency as the channel between the apparatus and the first node.

17. The method according to claim 16, further comprising:
selecting the second node as a next access node for communication based on comparing the first channel access parameter to the second channel access parameter.

18. The method according to claim 15, further comprising:
determining a third channel access parameter for a third channel between the apparatus and a third node based at least partly on a third channel access related parameter received from the first node and a third congestion indication received from the third node, wherein the third channel is on a different frequency than the channel between the apparatus and the first node.

19. The method according to claim 18, further comprising:
selecting the third node as a next access node for communication based on comparing the first channel access parameter to the third channel access parameter.

20. One or more non-transitory computer readable media storing computer program code that, when executed, causes an apparatus to at least:
determine a combined congestion indication which is based at least on a first congestion indication received from a first node and a second congestion indication received from a second node;
determine a first channel access parameter for a channel between the apparatus and the first node based at least partly on at least one channel access related parameter received from the first node and the combined congestion indication; and
determine a second channel access parameter for the channel between the apparatus and the first node based at least partly on the at least one channel access related parameter and the combined congestion indication.

* * * * *